United States Patent
Metro et al.

[11] Patent Number: 5,859,884
[45] Date of Patent: Jan. 12, 1999

[54] ELECTRIC CIRCUIT FOR SELECTIVELY PROCESSING ELECTRICAL SIGNALS

[75] Inventors: Bernard J. Metro, Monroeville; Carl A. Vitalbo, Pittsburgh; Richard B. Miller, Ligonier, all of Pa.

[73] Assignee: Westinghouse Electric Corporation, Pittsburgh, Pa.

[21] Appl. No.: 967,415

[22] Filed: Nov. 11, 1997

Related U.S. Application Data

[63] Continuation of Ser. No. 408,428, Mar. 22, 1995.
[51] Int. Cl.[6] ..................................................... G21C 7/36
[52] U.S. Cl. ........................... 376/259; 376/216; 439/189
[58] Field of Search ..................................... 376/215, 216, 376/259; 439/189

[56] References Cited

U.S. PATENT DOCUMENTS

| | | | |
|---|---|---|---|
| 4,574,068 | 3/1986 | Hill et al. | 376/259 |
| 5,059,382 | 10/1991 | Jahnke et al. | 376/216 |

*Primary Examiner*—Daniel D. Wasil

[57] ABSTRACT

An electrical circuit backfits into different instrumentation and control (I&C) system hardware configurations as a replacement or upgrade. The circuit has a multiple signal path processing circuit including a multi-functional ASIC. A fixedly configured, multiple signal path connector such as a hardwired multi-pin package removably connected with a pin socket in the processing circuit connects the ASIC with the I&C system for coupling inputs to and outputs from the ASIC and for selecting operative signal paths of the ASIC.

15 Claims, 3 Drawing Sheets

ELECTRIC CIRCUIT FOR SELECTIVELY PROCESSING ELECTRICAL SIGNALS

CROSS REFERENCE TO RELATED APPLICATIONS

This application is a Continuation of application Ser. No. 08/408,428 filed Mar. 22, 1995, which is copending herewith.

BACKGROUND OF THE INVENTION

This invention relates to an electrical circuit having multiple signal paths for processing electrical signals and, more particularly, to a circuit having selectable signal paths for processing signals received from different system hardware configurations or received for performing selected functions.

The invention is particularly useful in connection with instrumentation and control (I&C) systems of complex industrial process and power plants. Analog and digital components of I&C systems of complex industrial process and power plants tend to wear out after about five years or more and must be periodically replaced as long as the plants continue to operate. However, the development of integrated circuits having up to 50,000 (50K) gates or more on a chip (very large scale integration) and other dramatic improvements in the cost and performance of digital technology over the past ten to twenty years have so restructured the I&C field that many analog and digital components originally employed in vintage I&C systems are no longer available at acceptable prices or have been substantially redesigned. Accordingly, vintage I&C systems must be redesigned at ever increasing costs to utilize currently available components when the original components are discontinued.

Existing I&C systems may be completely replaced with modern full system upgrades to obtain the advantages of state of the art digital technology. The assignee of the present invention, for example, provides a digital I&C system (known as the Eagle 21 system) for commercial pressurized water nuclear reactors to upgrade existing analog systems, including the Foxboro H-line, Hagan and Westinghouse 7100 and 7300 and other I&C systems. Advantageously, the Eagle 21 system provides additional capabilities of automatic calibration, automatic system self-testing and additional computer data link channels. However, the substantial cost of a full system upgrade of a nuclear power plant even with its increased capabilities frequently is not justified when compared with the significantly lower cost of simply maintaining the current I&C system.

Where full I&C system upgrades can not be justified, programmable logic controllers or other microprocessor-based hardware may be employed to replace vintage analog and/or digital components and circuits. Thus, for example, B&W and Framatome provide their STAR microprocessor based modules and the Foxboro Company provides its SPEC 200 micro hardware to upgrade nuclear plant I&C systems. However, the Nuclear Regulatory Commission and the commercial nuclear power industry are very concerned about software common-mode failures of such devices and their sensitivity to plant environs. Thus, they require that the software be validated and verified before installation in nuclear power plants, which requires considerable time and effort.

Application specific integrated circuits (ASICs) were originally developed in the defense field for uses which require the high reliability and high performance of digital electronic technology without the perceived disadvantages of software. More recently, ASICs have been used in digital watches, communications and other mass markets where the ASIC related costs can be distributed over thousands of devices. General information regarding ASICs may be found in the "ASIC & EDA" magazine (which was retitled "Integrated System Design" as of the March 1995 issue). Other state of the art circuits and devices which do not require the use of software are available, including field programmable gate arrays (FPGAs), electrically programmable logic devices (EPLDs) and electrically programmable analog circuits (EPACs).

The electronics industry is presently able to produce an ASIC which can be economically employed in small markets such as I&C systems of nuclear power plants and chemical processing plants. However, these types of markets are frequently served by more than one vendor and each vendor will upgrade its products over time. Thus, ASIC based circuit boards and modules must be as functionally versatile as possible and must be able to interface with different system hardware configurations if they are to be useful in fragmented markets.

SUMMARY OF THE INVENTION

It is an object of the present invention to provide functionally versatile solid state electrical circuits for processing signals along programmed paths without requiring the use of software. It is a further object to provide versatile circuits adaptable to interface with different system hardware configurations.

With these objects in view, the present invention resides in an electrical circuit having a multiple signal path processing circuit for processing electrical signals and a fixedly configured, multiple signal path connector electrically connected with the multiple path processing circuit for coupling inputs to and outputs from the multiple signal path processing circuit and for connecting operative signal paths of the processing circuit. As used in this description and in the following claims of invention, "fixedly configured", means the connector cannot be readily modified or altered at any time whether or not part of a circuit. Preferably, the fixedly configured connector is removably connected with the electrical circuit. The multiple signal path processing circuit may include an ASIC, FPGA, EPLD, or EPAC for processing various information and power signals. Also, the circuit may process digital and/or analog signals.

In the preferred embodiment of the present invention, a fleet of ASIC based devices is adapted to interface with differently configured system hardware. The ASIC is preferably multi-functional, i.e., the ASIC can function as a multipler-divider, comparator and the like. Most preferably, the ASIC is a generic circuit which can perform all of the functions needed by the system in which it is to be employed. Thus, in the preferred embodiment, one ASIC based device may be backfit in an existing 7100 or a 7300 I&C system as a function for fuction replacement or, alternatively, as a channel replacement.

In the preferred embodiment of the present invention, each ASIC based device preferably has at least two fixedly configured connectors. A first connector (which will be referred to hereafter as a "function selector") interfaces with the ASIC for connecting the functions which are to be performed by the ASIC. The function selector is the single distinguishing feature of the ASIC based device which adapts it to its intended application in the system. Advantageously, the function selector is one of several differently configured function selectors which may be alternatively employed. Importantly, the function or combination of functions to be performed by the ASIC can only be altered by removing and replacing the particular function selector with a differently configured selector. Also, the user is not able to modify a tested ASIC based device to create a new, unintended or untested application of the ASIC based device.

The second fixedly configured connector (which will be referred to hereafter as an "adaptor selector") of the preferred embodiment interfaces with the hardware configuration of the system in which the invention is to be employed. The adaptor selector transmits information and power signals from a cabinet backplane or other hardware to the multiple signal path processing circuit. The adaptor selector is one of several differently configured selectors which may be alternatively employed. Each adaptor selector has a unique configuration for interfacing with one of the different system hardware configurations.

Advantageously, multiple signal path processing circuits of the preferred embodiment with one or more removable, fixedly configured, multiple signal path connectors installed therein can be backfit into existing systems with little, if any, field wiring outside of the cabinets. The existing I&C systems may be readily modified or upgraded and the circuits tested before the system goes back on line. Preferably, the fixedly configured connectors are hardwired devices which are removably insertable in pin sockets. Most preferably, the pin devices are plastic encapsulated packages having hardwired pin to pin lines connecting the inputs and the outputs of the packages.

BRIEF DESCRIPTION OF THE DRAWINGS

The invention as set forth in the claims will become more apparent from the following detailed description of a preferred embodiment thereof shown, by way of example only, in the accompanying drawings, wherein:

DESCRIPTION OF THE PREFERRED EMBODIMENT

In the preferred practice of the present invention, an ASIC based device 10 is employed to backfit existing I&C systems of commercial pressurized water nuclear reactors provided by the assignee of the present invention, including the Foxboro H-line, Hagan, and Westinghouse 7100 and 7300 systems. Circuits including FPGAs, EPLDs, EPACs, and other multiple signal path processing circuits which do not require the use of software may be employed in place of ASICs in other applications. The device 10 must transmit multiple signals, including incoming and outgoing information signals and power signals from and to the system in which it is to be installed and employed. In addition, the device 10 must transmit a power signal and also incoming and outgoing information signals to and from the ASIC. Advantageously, the ASIC based device 10 may be employed as a simple card-for-card replacement of existing components or as a card-for-channel (and, perhaps, combining several cards or modules) upgrade together with some upgrade of system features. Importantly, existing systems can be standardized on one platform having selectable digitized functions. Advantageously, the device 10 is mechanically, electrically and electronically compatible with the several differently configured systems. Thus, there will be minimal field wiring and system reconfiguration. In addition, a system may be upgraded in a series of steps as plant personnel become familiar with new devices and procedures.

Figure 2:
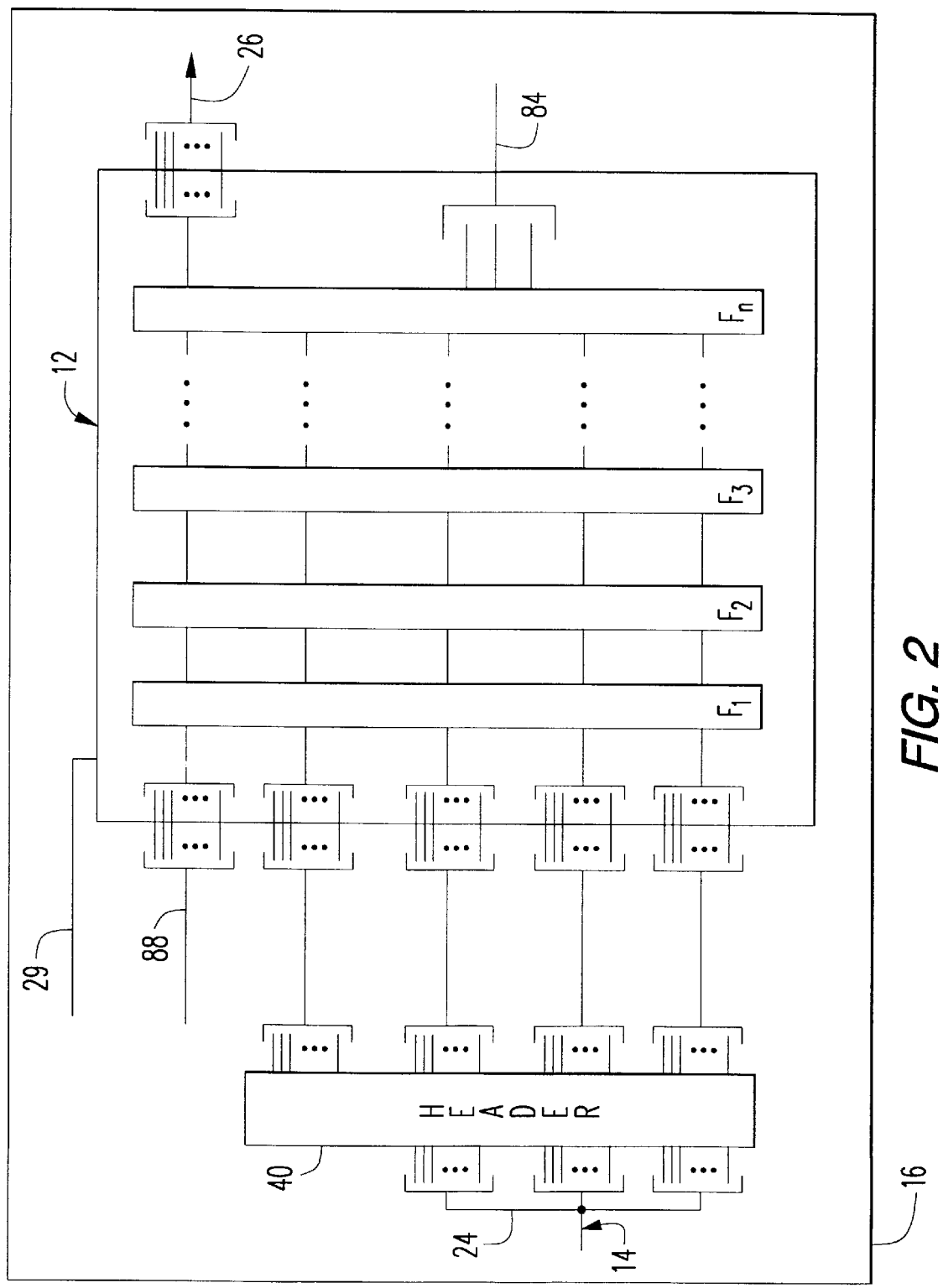
FIG. 2 is a schematic representation of an ASIC which may be employed with the device shown on FIG. 1.

As shown in FIG. 2, the device 10 has an ASIC chip 12 interfaced with a first carrier circuit 14. The ASIC chip 12 and the first carrier circuit 14 may be supported on a first carrier such as a daughter board 16 which in turn is supported by a second carrier such as a mother board 20. Although less versatile, the first carrier 16 and the second carrier 20 may form one printed circuit board (not shown). The ASIC chip 12 may be implemented by low power MOS technology and the various standard digital components supported on the carriers such as converters, voltage regulators, clocks and the like may be obtained commercially.

The ASIC chip 12 is designed to perform a plurality of standard electronic functions designated on FIG. 2 as $F_1$, $F_2$, $F_3$ ... $F_n$ preferably performing multipler-divider,integrator, lead-lag comparison, function generation and other functions which may be needed by the system in order to provide the greatest possible generally applicability to the system in which it is to be employed. Most preferably, the chip 12 will perform all of the standard electronic functions and all combinations of functions which are needed by the system. Generally speaking, there is sufficient gate space on ASIC chips to perform normal process protection channel functions and logic functions now performed by cards and modules used in I&C systems of commercial nuclear plants. A pressurizer vessel pressure channel, for example, requires up to about 8K to 10K gates. Overtemperature delta temperature (OTDT) and overpower delta temperature (OPDT) channels require up to about 40K to 50K gates. It is noted that OTDT and OPDT functions, which now require more than about 20 discrete element printed circuit cards in present I&C systems in commercial nuclear power plants, can be performed on three or fewer cards in the practice of the present invention. Advantageously, the use of a device 10 results in the generation is of considerably less heat which needs to be dissipated in the control cabinets. Also, the various components in the cabinets can be expected to last longer because there will be less of a temperature rise in the cabinets. In addition, a set of two or more chips on a board or several boards may be employed if, for example, additional features such as self-diagnostics and auto-test capability, which may require substantially increased gate capacity, is desired.

The first carrier circuit 14 is designed to deliver digital signals to and from the ASIC chip 12. Preferably, the first carrier circuit 14 includes all digital circuits which support the chip 12 independently of the I&C system hardware configuration. Digital information signals in a single bit/word format are received from and delivered to the second carrier circuit 22 via first carrier circuit inputs 24 and outputs 26. The first carrier circuit 14 supports input circuitry having input connectors, such as card-edge contacts 100, and analog to digital circuitry 68. The first carrier circuit 14 also supports output circuitry having output connectors and digtial to analog circuitry 76. The first carrier circuit 14 also receives power from a power supply 28 via line 29 and clock pulses from a digital clock 30 on the second carrier 16. Preferably, the power supply 28 comprises a direct current/direct current voltage converter to provide high quality power voltages necessary to drive itself, the first carrier circuit 14 and the ASIC chip 12. The converter preferably has a power factor correction to block feedback of harmonic distortion typical of switching mode power supplies, which can affect the quality of power received by other circuits in analog system cabinets. The digital clock 30 may be provided with a bypass to permit the use of an off-board system clock (not shown) when testing the system.

The function or combination of functions which are to be performed by the chip 12 in a particular application are selected by a removable, fixedly configured, multiple signal path ASIC function selector (or connector) 40 as shown in FIG. 2. The function selector 40 is the single distinguishing feature of the ASIC based device 10 which adapts the device 10 to the intended application in the system. In addition to receiving the power and information signals from the second carrier circuit 22, the function selector 40 turns on or off the functions $F_1, F_2, F_3 \ldots F_n$ which the chip 12 is to perform, and/or patches in values representative of mathematical constants or setpoints from an operator interface 38 mounted on the second carrier 20. The operator interface 38 has accessible adjustments and settings for establishing setpoint values, their high/low significance, and digital/analog operating mode selection. The selector 40 provides the voltage equivalent of a logical "1" or "0" to specific pin connections of the first carrier circuit 14. Thus, the inputs provided from the operator interface 38 via the selector 40 to the chip 12 is part of the digital data being processed by the chip 12. The ASIC chip 12 logically combines the inputs with the digital data representation of the input signal from the second carrier 20 to provide a unique output on output lines 26 for each given input state.

The function selector 40 is preferably color coded and/or labeled to readily distinguish one selector 40 from other differently configured selectors. Thus, for example, one color coded function selector 40 may be configured to enable the ASIC chip 12 to simply compare the input signal to a chosen setpoint value, which is a common function that must be performed. A differently color coded function selector 40 may be configured to enable the same ASIC chip 12 to perform some or all of the functions of an OTDT channel or an OPDT channel. Although all functions may be performed on a single chip 12, the functions may be performed on, e.g., three or more cards in order to provide various testing points.

Figure 3:
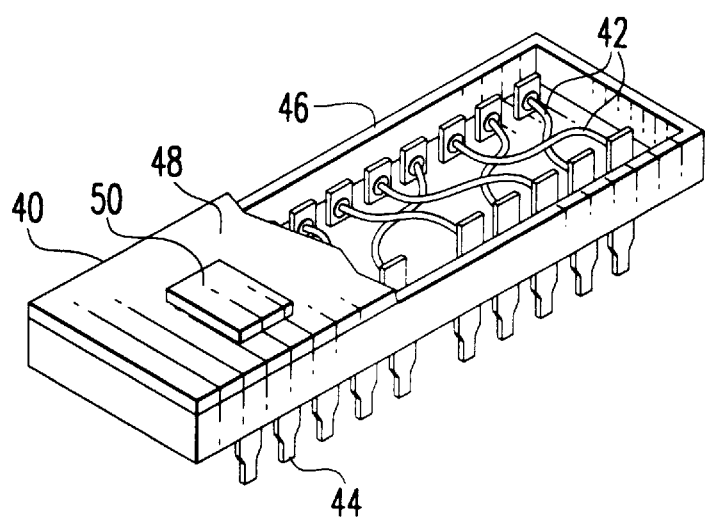
FIG. 3 is a partially sectioned perspective view of an ASIC function selector shown on FIG. 2.

FIG. 3 illustrates a preferred function selector 40 as a multi-pin passive device with pin to pin lines or wiring 42 extending between its pins 44. The wiring may be insulated wires in a plastic encapsulated DIP package 46 having a cover 48 glued thereon. Also, the package 46 may have a DIP switch 50, in, e.g., a power supply line to provide optional capabilities. The selector 40 may be installed in a standard DIP socket (not shown) in the first carrier circuit 14. Preferably, there is only one possible orientation of the removable function selector 40 with the DIP socket, which interchangeably receives differently configured function selectors. Thus, installation of a color coded function selector 40 provides a convenient, visually verifiable means of making connections and eliminating the tedious and time consuming task of individually verifying numerous card jumper configurations. The second carrier circuit 22 must be mechanically compatible with various system hardware configurations. In addition, the second carrier circuit 22 must be compatible with signal types and magnitudes and must provide a common digital representation on line 24 to the first carrier circuit 14. For example, analog signals may be in the form of varying voltage or varying current. Commonly, voltage levels vary from 0–10 volts and current levels vary from 4–20 mA or from 10–50 mA. In analog I&C systems, the incoming analog information signals must be processed, filtered, amplified or attenuated and conditioned.

Thus, the second carrier circuit 22 transmits the incoming analog signals via a surge withstand circuit 62, a low pass filter 64, a signal conditioner 66 and an analog to digital converter 68 in line 60 and then to an input selector (or connector) 70 coded for analog operation. The input selector 70 passes the information signals along with the various signals from the power supply 28, the clock 30 and the operator interface 38 to the first carrier circuit 14. The input selector 70 preferably is a passive fixedly configured device like the function selector 40 discussed above and illustrated by FIG. 3, which fits with a pin socket (not shown) in the second circuit 22. A conditioned analog input signal may be transmitted via an isolator 72 in line 74 as an isolated analog output indication. Similarly, output digital signals from the first carrier circuit 14 may be transmitted to the analog I&C system via a digital to analog converter 76 in line 78 and bistable outputs may be transmitted via an output line 84. Also, an isolated output analog signal may be transmitted via an isolator 80 in line 82.

I&C systems which have previously been upgraded to digital sensors already provide digitized input signals. Thus, in these applications, the second carrier circuit 22 need only transmit the incoming digital signals on lines 86 and 88 directly to the first carrier circuit 14 via an input selector 70 coded for digital operation. The input selector 70 passes the information signals along with the various signals from the power supply 28, the clock 30 and the operator interface 38 to the first carrier circuit 14. Similarly, output digital signals from the first carrier circuit 14 need only be transmitted to the digital system via line 90 and an isolated digital signal may be output via an isolator 92 in line 94. In cases where the input selector 70 is to be exclusively employed in connection with either analog or digital systems, an input selector 70 is optional and the second carrier circuit 22 may be designed for either analog or digital operation.

Figure 1:
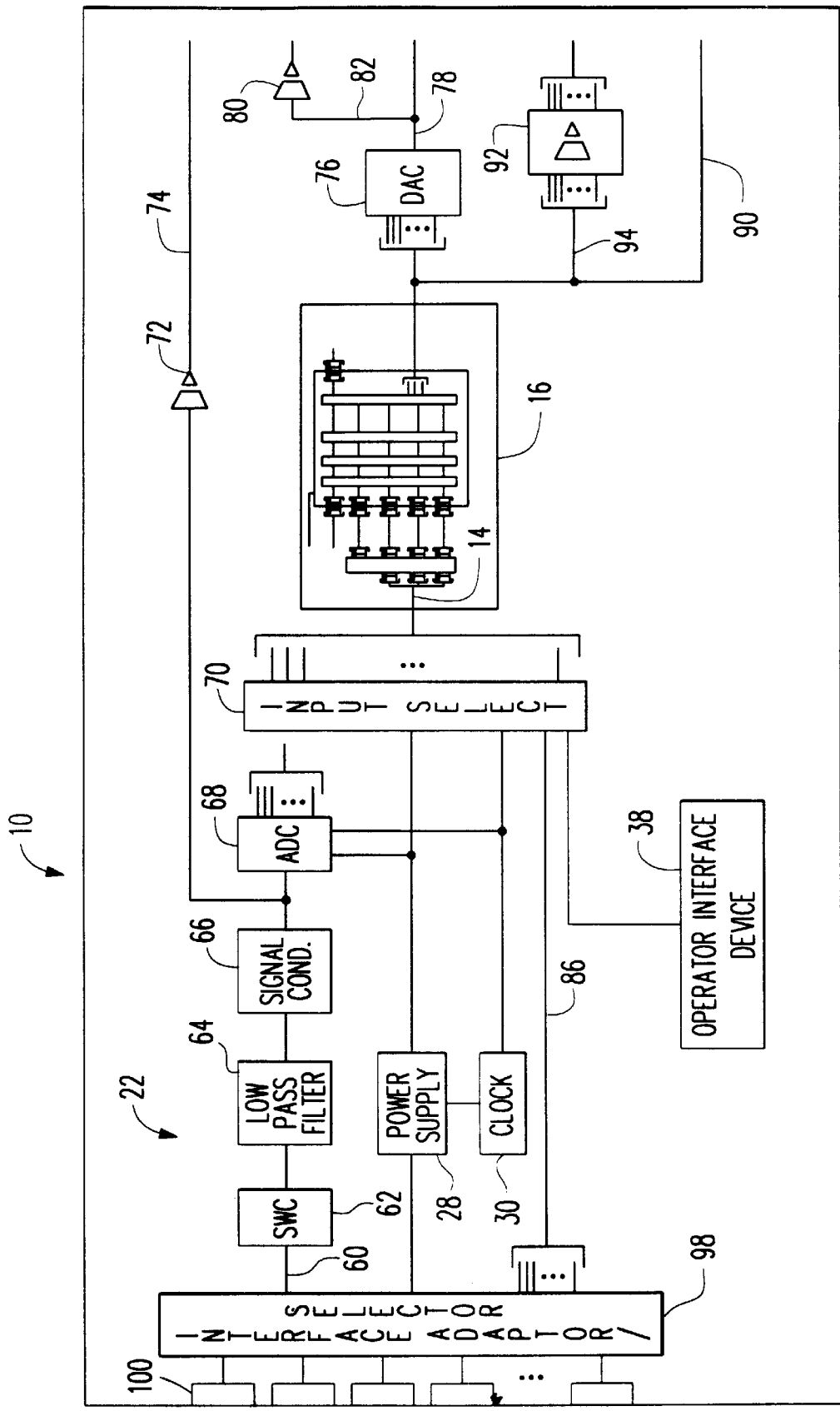
FIG. 1 is a schematic representation of an ASIC based device embodying the present invention.

The second carrier circuit board 20 is representative of a fleet of second carrier circuit board classes. Each second circuit board carrier circuit board 20 provides an interface between the first carrier circuit 14 as described above and an I&C system (not shown). FIG. 1 illustrates a second carrier circuit board 20 having metal foil edge system/circuit contacts 100 embedded in the edge of the second carrier circuit board 20 for engaging conventional card edge "finger" or "pincher" connectors in slots of cabinet backplanes of control cabinets of I&C systems (not shown). Each second carrier class is characterized by a unique interface adaptor selector (or connector) 98 connected with the card-edge contacts 100 and with the second carrier circuit 22 for interfacing with one of the different system hardware configurations. The interface adaptor selector 98 preferably is a passive fixedly configured device like the function selector 40 discussed above and illustrated by FIG. 3, which fits with a pin socket (not shown) in the second circuit 22. The interface adaptor selector 98 compensates for existing variations of the standard card slot pin locations. The variations result from printed circuit board layout practices employed to minimize circuit interference and optimize board topology of original components. The ASIC based device 10 accommodates these differences in a simple effective way which minimizes the total cost of implementing the upgrade. If the interface adaptor selector 98 were not provided, the user would need to perform wiring changes. In the preferred practice of the present invention in process protection systems of commercial pressurized water nuclear power plants, one class of second carriers 20 is adapted by a configured adaptor selector 98 to interface with the Foxboro H-line system, a second class is adapted by a differently configured adaptor selector 98 to interface with the Westinghouse 7100 system and a third class is adapted by yet another differently configured adaptor 98 to interface with the Westinghouse 7300 system.

Preferably, in backfit situations, the ASIC based device 10 preserves any existing system test points and includes self diagnostic capabilities which may be used to provide automatic test capability for the device. In addition, the device 10 preferably includes a test-in-bypass capability.

While a present preferred embodiment of the present invention has been shown and described, it is to be understood that the invention may be otherwise variously embodied within the scope of the following claims of invention.

What is claimed is:

1. A method of upgrading an electrical signal processing system of a nuclear power plant, said system having a plurality of analog circuits which perform a plurality of functions embodied on a plurality of replaced cards, the method comprising the steps of:

providing a replacement card comprising: input and output connectors, a multiple function digital processing circuit capable of performing a plurality of digital functions determined by the physical arrangement of a plurality of connections to the digital processor's circuit, analog to digital circuitry connected between said input connector and an input of said digital processing circuit and operable to receive an analog input signal and convert it to a digital signal for processing by said digital processing circuit, said digital processing circuit in communication with said output connector, and a removable hardwired function selector connected among at least two of the plurality of connections to the digital processing circuit, said function selector operable to enable said replacement card to perform a selected function which corresponds to a function performed by one of said replaced card; and replacing the said one of said replaced cards with said replacement cards.

2. The method of claim 1, wherein said function selector is operable to enable said digital processing circuit to perform a plurality of functions which correspond to the functions performed by a plurality of said replaced cards, and further comprising the step of replacing a plurality of said replaced cards with said replacement card.

3. The method of claim 2, wherein said plurality of said functions comprises one of the overtemperature delta temperature and overpower delta temperature functions of said nuclear power plant.

4. A method of upgrading an analog electrical processing system of a nuclear power plant having a plurality of analog circuits on a plurality of analog cards that interconnect with an electrical interface on the processing system, the method comprising the steps of:

providing a replacement card comprising an input and an output connector, an ASIC chip capable of performing a plurality of digital functions, analog to digital circuitry connected between said input connector and the input of said ASIC chip, said ASIC chip communicating with said output connector, and hardwired adapter means for interconnecting said input and output connectors with said ASIC chip in a manner that replicates the function of at least one of said analog cards;

connecting an interface selector with said adapter means, thereby adapting said replacement card to be compatible with the electrical interface on the processing system; and replacing at least one of said analog cards with said replacement card.

5. The method of claim 4, wherein said replacement card comprises a first replacement card and said interface selector comprises a first interface selector, and further comprising the steps of:

providing a second replacement card identical to said first replacement card;

connecting a second interface selector with said adapter means of said second replacement card, thereby adapting said second replacement card to perform the function of a second of said analog cards; and replacing a second of said analog cards with said second replacement card.

6. The method of claim 4, wherein said interface selector and said adapter means are operable to adapt said replacement card to perform the functions of a plurality of said analog cards; and replacing a plurality of said analog cards with said replacement card.

7. A replacement card for an analog electrical signal processing system of a nuclear power plant having a plurality of cards containing analog circuitry for performing a plurality of functions, said replacement card comprising:

input connector operable to receive an analog input signal into said replacement card;

analog to digital converter connected to said input connector and operable to convert said analog input signal to a digital input signal;

digital circuitry connected to said analog to digital converter and operable to process said digital input signal and to generate a digital output signal;

output connector connected to said digital circuitry; and removable adapter means for selectively interconnecting said digital circuitry and said input and output connectors, thereby adapting said replacement card to perform at least one of said functions.

8. The replacement card of claim 7, wherein said adapter means is operable to enable said replacement card to perform a plurality of said functions.

9. The replacement card of claim 7, wherein said adapter means further comprises a switch.

10. The replacement card of claim 7, wherein said adapter means further comprises a means for providing optional capabilities.

11. The replacement card of claim 10, wherein said means for providing optional capabilities further comprises a switch.

12. The replacement card of claim 7, wherein said adapter means further comprises a means for switching the capabilities of said replacement card.

13. A nuclear power plant comprising:

an electrical signal system; and an electrical circuit connected with said electrical signal processing system, said circuit comprising:

a multiple signal path processing circuit for processing a plurality of electrical signals; and a hardwired function selector removeably connected with said multiple signal path processing circuit, said adapter operable to connect a first portion of said multiple signal path processing circuit with said electrical signal processing system;

said function selector further comprising a means for switching operable to connect a second portion of said multiple signal path processing circuit with said electrical signal processing system.

14. The method claim 1 wherein said function selector means further comprises a means for switching the capabilities of said replacement card.

15. The method of claim 4, wherein said adapter means includes an input selector and function selector.

\* \* \* \* \*